(12) United States Patent
O'Brien (10) Patent No.: US 6,253,898 B1
(45) Date of Patent: Jul. 3, 2001

(54) EQUIPMENT LOADING PLANK

(76) Inventor: Daniel F. O'Brien, 9652 Duke Dr., Westminster, CA (US) 92683

( * ) Notice: Subject to any disclaimer, the term of this patent is extended or adjusted under 35 U.S.C. 154(b) by 0 days.

(21) Appl. No.: 09/217,692

(22) Filed: Dec. 21, 1998

Related U.S. Application Data (60) Provisional application No. 60/070,329, filed on Jul. 2, 1998.

(51) Int. Cl.⁷ ................................................. B65G 11/18
(52) U.S. Cl. ........................ 193/38; 193/2 R; 108/65; 108/98; 248/223.41; 248/250
(58) Field of Search ..................... 193/38, 3, 4, 5, 193/25 FT, 2 R; 108/65, 90, 97, 98; 248/223.41, 225.21, 250, 637

(56) References Cited

U.S. PATENT DOCUMENTS

| | | | |
|---|---|---|---|
| 3,259,082 | * | 7/1966 | Williams ............................ 108/97 |
| 3,594,055 | * | 7/1971 | Lohr et al. ......................... 312/215 |
| 4,279,504 | * | 7/1981 | Brown et al. ....................... 355/72 |
| 4,294,363 | * | 10/1981 | Oztekin et al. .................... 211/59.2 |
| 4,488,833 | * | 12/1984 | Perry et al. ........................ 404/35 |
| 4,606,280 | * | 8/1986 | Poulton et al. ..................... 180/97 |
| 4,720,069 | * | 1/1988 | Bessinger .......................... 248/250 |
| 4,860,984 | * | 8/1989 | Alperson ......................... 248/225.21 |
| 4,944,416 | * | 7/1990 | Petersen et al. ..................... 52/36.5 |
| 5,077,780 | * | 12/1991 | Lee, Jr. ............................ 378/196 |
| 5,138,803 | * | 8/1992 | Grossen . |
| 5,344,264 | * | 9/1994 | Hevoyan ........................... 409/235 |
| 5,346,078 | * | 9/1994 | Ernetoft ............................ 211/90.01 |
| 5,452,875 | * | 9/1995 | Kern ................................... 248/242 |
| 5,460,103 | * | 10/1995 | Dunn et al. ........................ 108/51.1 |
| 5,590,607 | * | 1/1997 | Howard ............................... 108/98 |
| 5,799,803 | * | 9/1998 | Muller .............................. 211/90.01 |
| 5,931,426 | * | 8/1999 | Heckner ........................... 248/220.21 |

OTHER PUBLICATIONS

Advertisement for Shop Accessories Spi, Vise Caddy, 98–238–9.
Advertisement for Rutland Tool & Supply, Vise Trolly, Model 2293 0200.

* cited by examiner

*Primary Examiner*—Christopher P. Ellis
*Assistant Examiner*—Mark A. Deuble
(74) *Attorney, Agent, or Firm*—Skjerven Morrill MacPherson LLP; Brian D. Ogonowsky; Michael J. Halbert (57) ABSTRACT

An equipment loading plank that is detachably mounted on a machine tool table and used for easy and safe installation and removal of equipment on and off the machine tool work tables. The equipment loading plank includes a flat rectangular shaped body with an upper loading surface and a lower seating surface and a leg downwardly extending at an angle from one end of said loading plank. The leg is inserted into a T-slot in the machine tool table to detachably mount the loading plank to the machine tool table. The leg has a front face and a lower face that converge such that the leg can be wedged into the T-slot when the loading plank is seated on the machine tool table parallel to the upper surface of the machine tool table. The leg ends in a foot that prevents the leg from slipping from the T-slot whenever loads are placed on the loading plank.

4 Claims, 9 Drawing Sheets

EQUIPMENT LOADING PLANK

This patent application claims priority based on U.S. provisional patent application serial no. 60/070,329, filed in the name of Daniel F. O'Brien on Jan. 2, 1998, entitled "Equipment Loading Aid Plank".

BACKGROUND

In the machine tool trade, such as computer numerical controlled machining (CNC machining), the work pieces and work piece holding devices, i.e., vices, are manually loaded and unloaded onto the work table of the machine tool. Machine operators commonly load and unload work pieces or holding devices, which may weigh up to 200 pounds, several times in a normal workday without assistance. Machine tools in general are poorly designed to ease the loading and unloading of auxiliary equipment and tooling. Typically, a machine tool operation cell is located inside an enclosure, which forces the operator to lean into and over the enclosure opening when loading or unloading work pieces and holding devices. Machine operators can suffer strains, back injuries, hernias, or other similar injuries while loading heavy and awkward tooling or work pieces onto the machine tool's work table. Moreover, machine operators can drop the heavy and awkward tooling or work pieces during loading, resulting in damage to the machine tool as well as the tooling or work piece.

Thus, there is a need for a device that will easily and conveniently assist a machine operator in the safe loading and unloading of work pieces and auxiliary equipment.

SUMMARY

A cantilever loading plank is used for loading and unloading equipment onto a machine tool table. The equipment loading plank includes a flat rectangular shaped body with an upper loading surface and a supporting bottom surface and a leg at one end of the loading plank. The leg extends downward from the plank and is inserted into one of the T-shaped slots that are conventionally found on machine tool tables. The leg has a front face and a lower face that may converge such that the leg can be wedged into the T-slot when the loading plank is seated on the machine tool table parallel to the upper surface of the machine tool table. A foot that extends from the end of the leg assists in holding the leg in the T-shaped slot. When the foot and leg are inserted into a slot in the machine tool table, a portion of the bottom supporting surface rests on the top surface of the machine tool table.

The loading plank may also include guide grooves in the top loading surface to provide tracks for keys or other protuberances on the item being loaded. The guide grooves prevent undesirable or accidental slippage of the item while an item is slid along the top loading surface of the loading plank. The loading plank may be corrugated, which decreases the material and therefore the cost of the loading plank while maintaining the strength of the loading plank so that it may support heavy items with a minimal amount of bending. The corrugation may also form the guide grooves.

The loading plank is easily and conveniently mounted onto a machine tool table by tilting the loading plank with respect to the surface of a machine tool table and inserting the foot and leg into a T-slot groove. The loading plank is then untilted so that a portion of the supporting bottom surface rests on the machine tool table. When mounted on the machine tool table, the loading plank protrudes outward from the machine tool table into the machine operator work zone. Advantageously, the operator can manually load heavy items onto the loading surface of the loading plank while practicing safe lifting methods, i.e., lifting with the legs, not the back, and holding the item close to the body. Thus, there is less likelihood of injury to the operator or accidentally dropping the item, resulting in damage to the machine tool table or the item. Of course, if desired the item may also be lifted and placed on the loading plank with forklifts, automated lifts or cranes. The item can then be easily and safely slid along the top loading surface of the loading plank and onto the machine tool table. Once the item is positioned on the machine tool table, the loading plank is easily disengaged from the table.

BRIEF DESCRIPTION OF THE DRAWINGS

The above and other features, aspects, and advantages of the present invention will become better understood with regard to the following description, appended claims, and accompanying figures, where:

DETAILED DESCRIPTION

Figure 1:
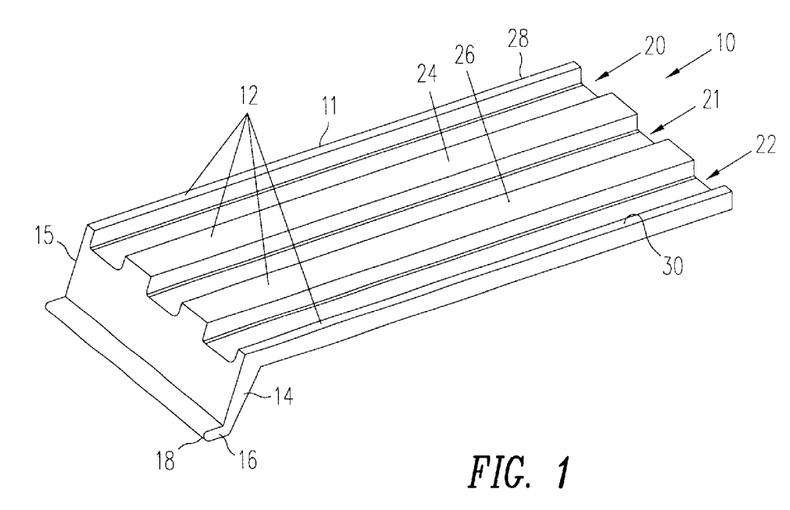
FIG. 1 illustrates a top perspective view of an "L" shaped loading plank.

FIG. 1 illustrates a top perspective view of an "L" shaped loading/unloading plank 10 ("loading plank") for loading and unloading tooling, equipment, and work parts onto and off the work table of a machine tool in accordance with an embodiment of the present inventions. Loading plank 10 includes a rectangular body 11 having an upper loading surface 12, a leg 14 with front surface 15 used to hold the loading plank 10 onto the work table surface, and a foot 16 at the terminus of the leg 14. Of course, body 11 need not be rectangular, but may be oval, square or any desired other shape. The leg 14 extends from one end of body 11 at a slight angle, while foot 16 is generally parallel with the loading surface 12. Leg 14 is shaped to extend into T-slots on a conventional machine tool table. At the end of foot 16 is a toe 18 that prevents loading plank 10 from unintentionally slipping out of a T-slot in the machining tool surface during use. Several longitudinal grooves 20–22 are formed in the loading surface 12 of loading plank 10. Grooves 20–22 lighten loading plank 10 while also reinforcing and stiffening loading plank 10 by increasing the cross-section thickness, thereby eliminating the need for a thick and heavy plank. In one embodiment a central groove 21 may be used as a guide for equipment, and is flanked on both sides by two flat loading surfaces 24, 26. Additional loading surfaces 28, 30 are provided outside flat surfaces 24, 26 to further stiffen loading plank 10. Grooves 20 and 22 may also be used to as guide grooves for a vise loaded longitudinally on loading plank 10. It should be understood that the specific number of grooves 20–22 shown in loading plank 10 in FIG. 1 is exemplary and that any number of grooves may be used if desired. Moreover, loading plank 10 may have no grooves if desired.

Figure 2:
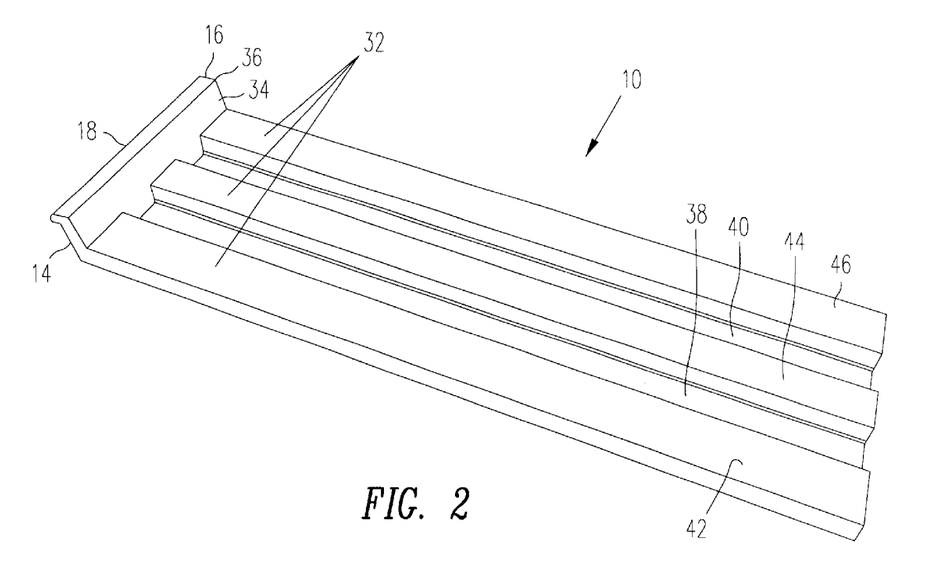
FIG. 2 shows a bottom perspective view of the loading plank.

FIG. 2 shows a bottom perspective view of a loading plank 10. Loading plank 10 includes a bottom supporting surface 32 a portion of which rests against a machine tool table when loading plank 10 is affixed to a machine tool table. The leg 14 is shown with a lower face 34 that transitions into a heel 36 of the foot 16. The forward end of foot 16 terminates in the toe 18, which may be finished as a rounded edge.

The underside of loading plank 10 includes two longitudinal grooves 38, 40. Grooves 38, 40 are between three flat surfaces 42, 44, and 46. Flat surfaces 42, 44, and 46 form the bottom supporting surface 32, a portion of which rests upon the work table surface during use.

Figures 3A, 3B, 3C:
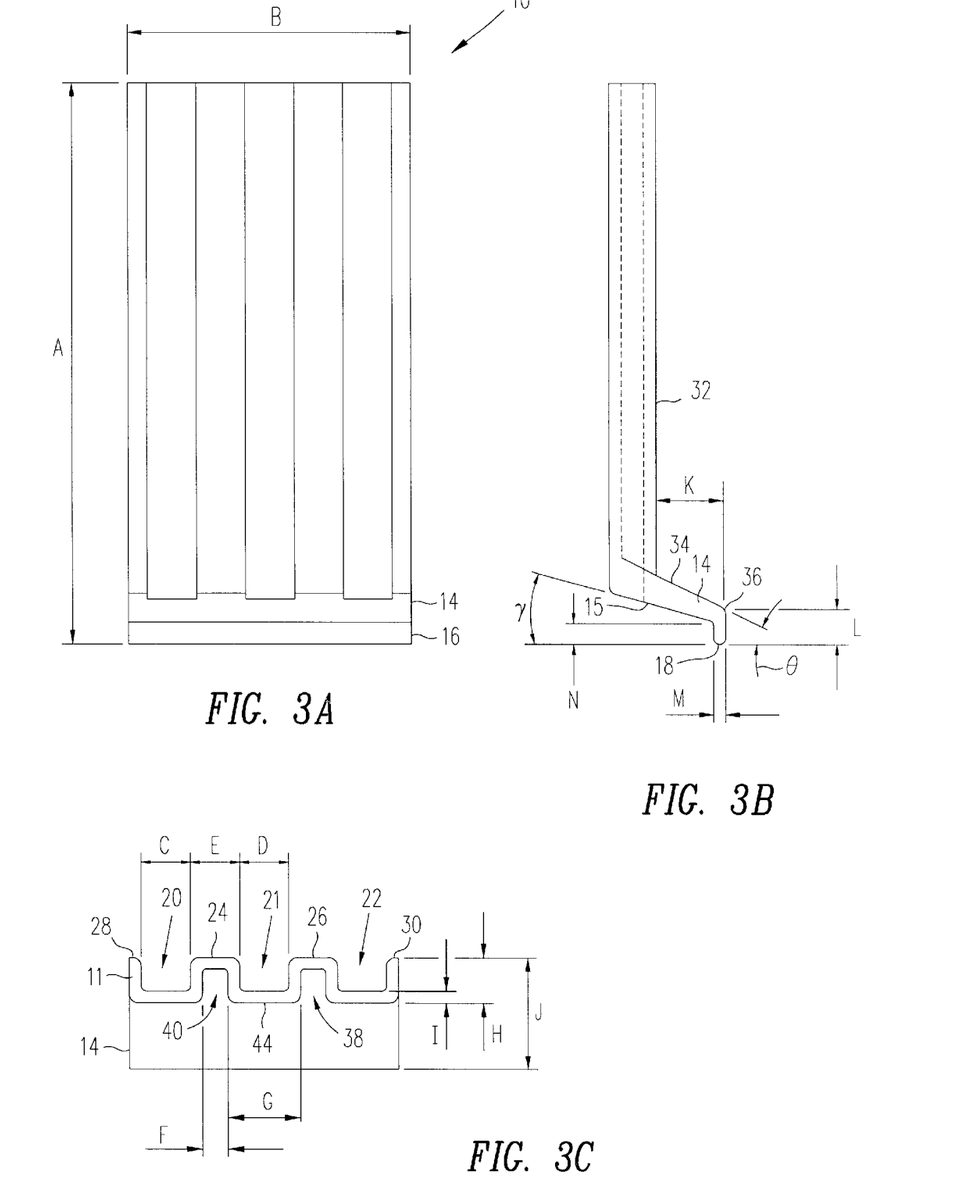
FIGS. 3A, 3B, and 3C are respective top plan, side, and end views of the loading plank.

FIGS. 3A, 3B, and 3C are respective top plan, side, and end views of loading plank 10. The loading plank 10 is approximately 22 inches in length (dimension A shown in FIG. 3A) and the width is approximately 7.2 inches (dimension B shown in FIG. 3A). Each grooves 20 and 22 in the top surface are approximately 1.25 inches (dimension C in FIG. 3C) and groove 21 is approximately 1 inch (dimension D), while flat surfaces 24 and 26 are approximately 1.6 inches each (dimension E). On the bottom surface, grooves 38 and 40 are approximately 1.3 inches (dimension F) and flat surface 44 is approximately 1.25 inches (dimension G). Body 11 has a total thickness of approximately 0.75 inches (dimension H) while the material forming body 11 is approximately 0.2 inches thick (dimension I). Loading plank 10 has a total thickness, including body 11 and leg 14 of approximately 1.65 inches (dimension J).

As shown in FIG. 3B, leg 14 extends downward from bottom supporting surface 32 by approximately 0.9 inches (dimension K). Foot 16 is approximately 0.5 inches long (dimension L) from toe 18 to heel 36, 0.275 inches thick (dimension M), and has a top portion from toe 18 to the front face 15 of leg 14, that is approximately 0.25 inches (dimension N). The lower face 34 of leg 14 has an angle of approximately 20 degrees from vertical (angle $\theta$) and the front face 15 has an angle of approximately 10 degrees from vertical (angle $\gamma$).

In one embodiment of the present invention, loading plank 10 is constructed from 6061T6 forged aluminum. The 6000 series aluminum material assures maximum strength with ease of construction, provides freedom from corrosion without secondary coating or corrosion protection measures, and it allows for a relatively light devise for ease in handling. In another embodiment, loading plank 10 is casted out of 356T6 aluminum. Other materials and construction techniques may also be employed including molded plastic, fiber reinforced resin, hard pressure treated wood, and casting a wide range of metals. While the present invention does not require or rely upon any particular material or dimensions, the chosen material and dimensions should be suitable for the use intended.

Figure 4:
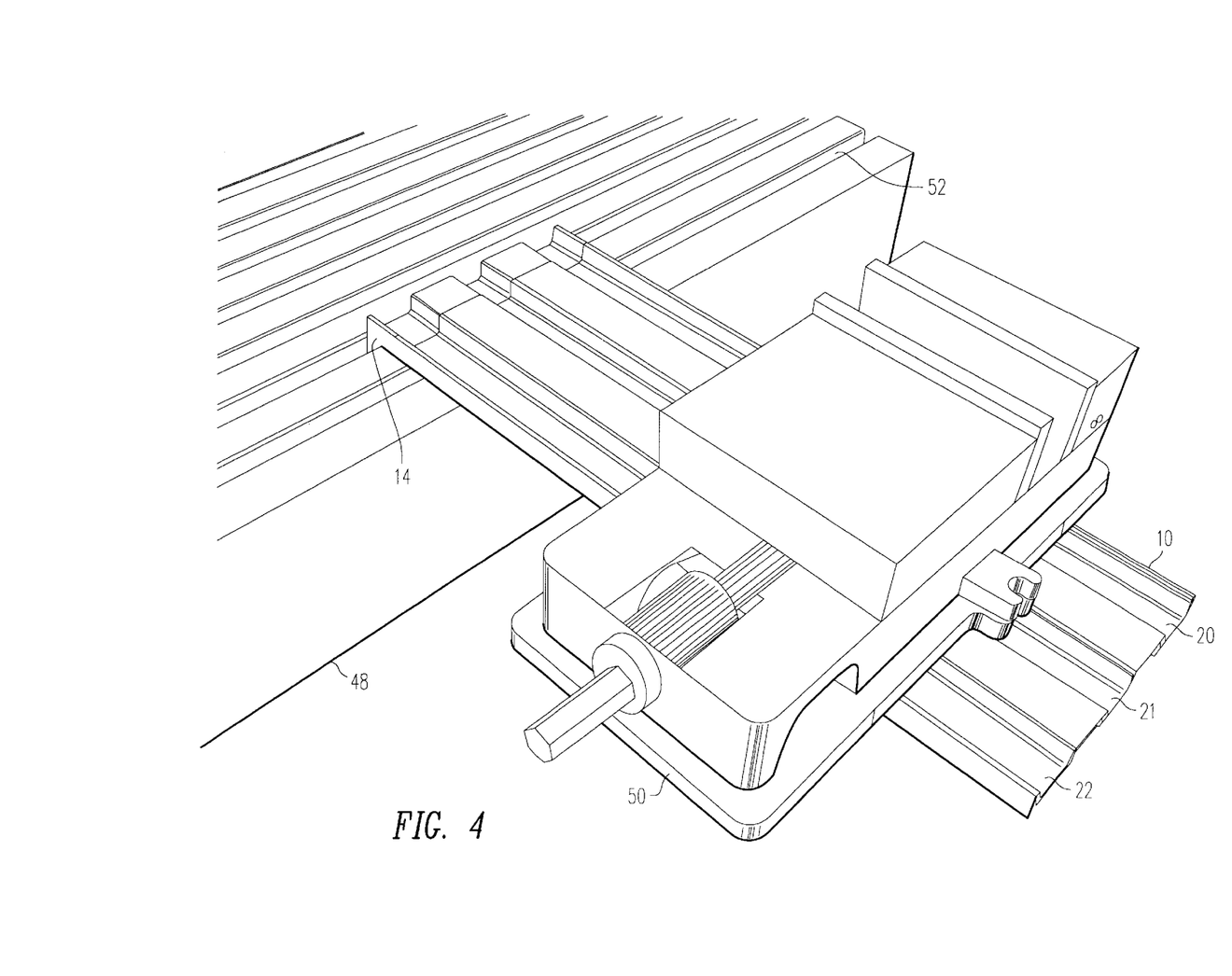
FIG. 4 illustrates a top perspective view of an embodiment of the loading plank installed in a machine tool table.

FIG. 4 illustrates a top perspective view of an embodiment of cantilever loading plank 10 installed in a machine tool table 48, such as the type commonly found in computer controlled machining centers. Loading plank 10 is used to support a machine vise 50 as the machine vise 50 is loaded or unloaded onto machine tool table 48. Loading plank 10 is shown attached to the machine tool table 48 with leg 14 inserted in a T-slot 52. As illustrated in FIG. 4, when loading plank 10 is affixed to machine tool table 48 it is cantilevered with a portion of loading plank 10 extending off the machine tool table 48 and into the machine operating work zone. Thus, the machine vise 50 can be easily lifted and placed onto loading plank 10 and slid onto machine tool table 48 at the desired position. Thus, there is no need for the machine operator to lean over machine tool table 48 to load machine vise 50. Machine vise 50 is prevented from sliding off loading plank 10 by a protuberance known as a key on the underside of the machine vise 50, (not visible in this view) that is slideably engaged with groove 21. It should be noted that loading plank 10 can be installed on machine tool table 48 at any T-slot at any desired location, e.g., the center of table 48 or at the side of table 48.

Figure 5:
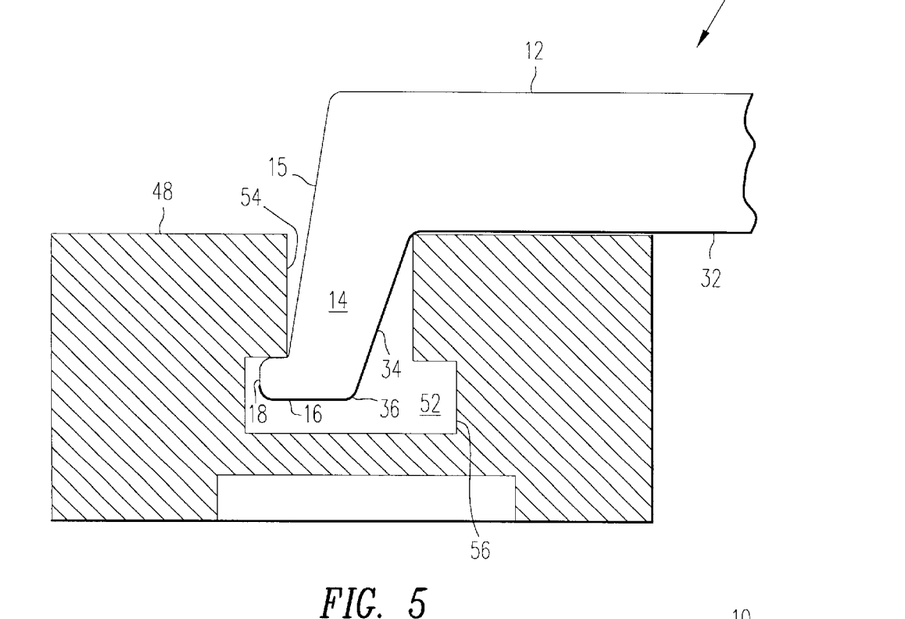
FIG. 5 illustrates a cross-sectional view of the loading plank affixed to a T-slot in a machine tool table.

FIG. 5 illustrates a cross-sectional view of loading plank 10 affixed in a T-slot 52 in machine tool table 48. A portion of supporting surface 32 of loading plank 10 rests on the top surface of machine tool table 48. The leg 14 of the plank 10 extends into the T-slot 52. The front face 15 of the leg 14 rests against one side of the throat 54 of T-slot 52, with the other side of the throat 54 abutting against the lower face 34 of leg 14 at the entry of throat 54. The foot 16 and toe 18 hook under the edge formed at the transition between the throat 54 and the head space 56. The wedging action of the front face 15 and lower face 34 of leg 14 in the throat 54 of T-slot 52, along with the toe 18 being hooked in head space 56, securely affix loading plank 10 to machine tool table 48. With loading plank 10 thus affixed to table 48, the loading planks 10 longitudinal axis is parallel to the surface of the machine tool table 48.

Loads, such as machine vise 50 (shown in FIG. 4) placed on the loading surface 12 cause the loading plank 10 to be depressed against the table's upper surface, which further wedges the leg 14 into the T-slot 52 and firmly holds the toe 18 in place under the ledge of the throat 54 and head space 56. Thus, loads on loading surface 12 will not lever the leg 14 from the T-slot 54.

In one embodiment, the transition from the loading surface 12 to the forward face 15 of the leg 14 is rounded to provide a smooth transfer of the equipment from loading surface 12 to the machine tool table 48. The transition between the loading surface 12 and the forward face 15 could be made with a smaller or larger radius or even an angular chamfer to suit the desired use of the loading plank 10. Moreover, the heel 36 of foot 16 is beveled or rounded to permit clearance for toe 18 during installation and removal of loading plank 10 from the T-slot 52.

The front face 15 and the lower face 34 of the leg 14 are angled at slightly less than ninety degrees to the loading surface 12 of the loading plank 10 so that leg 14 may interface with differing sizes of machine table T-slot throats. In one embodiment of the present invention, the front face 15 of the leg 14 has a slightly different angle than lower face 36, with front face 15 closer too vertical. The differing angles for front face 15 and lower face 35 of leg 14 cause the cross section of leg 14 to narrow near the foot 16. The narrowing of the leg 14 along with the general angled orientation of leg 14 with respect to loading surface 12 permits loading plank 10 to fit reliably and interchangeably with a range of machine tool table T-slot sizes. The range of fit, in one embodiment of the present invention, coincides with the size of T-slots used by the most common machine tools in use, with which the machine operator normally manually lifts heavy and bulky items onto the tool's tables.

Figure 6:
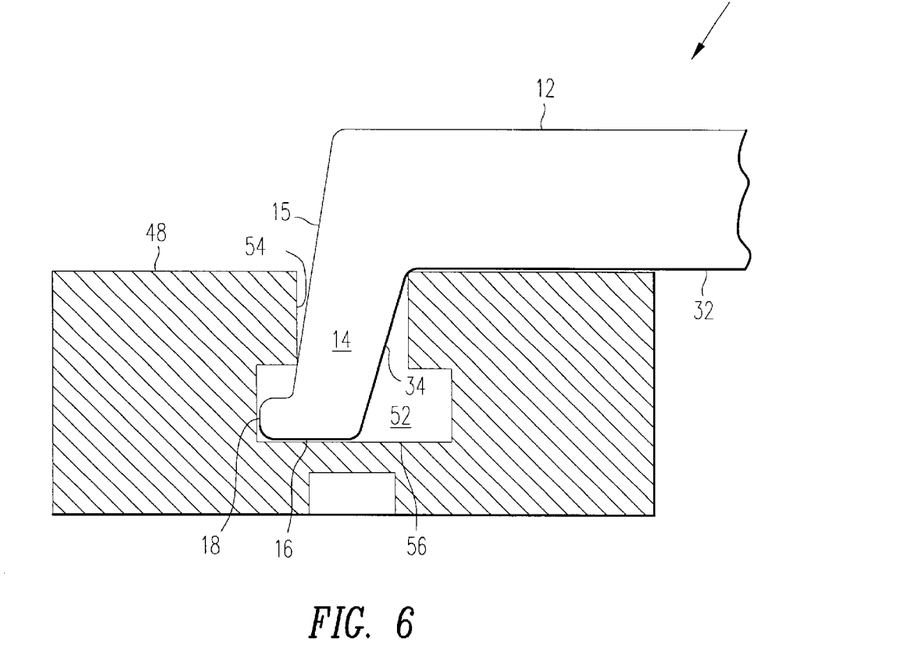
FIG. 6 illustrates a cross-sectional view of the loading plank affixed to a different sized T-slot in a machine tool table.

FIG. 6 illustrates a cross-sectional view of the loading plank 10 affixed in a T-slot 52 in a machine tool table 48, where the T-slot 52 represents a standard ½" T-slot dimension, as used in many small machine tools. FIG. 6 shows a portion of the bottom supporting surface 32 of loading plank 10 resting on the top surface of the machine tool table 48 with the leg 14 extending into the T-slot 52. The front face 15 rests against one side of throat 54 with the other side of the throat 54 abutting lower face 34 at the entry of the throat 54. The toe 18 is under the edge formed at the transition between the T-slot's throat 54 and head space 56 and the toe 18 is wedged against the end of the head space 56. Thus, loads placed on the loading surface 12 cause the loading plank 10 to be depressed against the table's upper surface, which further wedges toe 18 against the end of head space 56 holding loading plank 10 firmly in place in T-slot 52. Consequently, a load on loading surface 12 will not lever the leg 14 from ½" T-slot 52.

Figure 7:
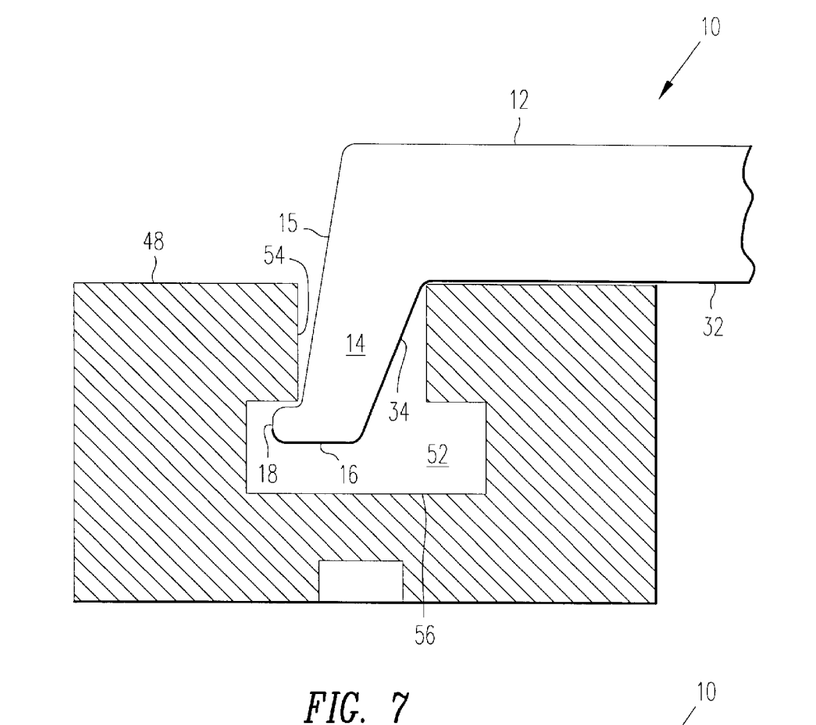
FIG. 7 illustrates a cross-sectional view of the loading plank affixed to a different sized T-slot in a machine tool table.

FIG. 7 illustrates a cross-sectional view of the loading plank 10 affixed in a T-slot 52 in a machine tool table 48, where the T-slot 52 represents a standard ⅝" T-slot dimension. A ⅝" T-slot is commonly found in large machine tools where operators are expected to manually load tooling and parts without the aid of cranes, hoists, fork lifts, and the like. Again, a portion of the supporting surface 32 rests on the top surface of machine tool table 48 with the leg 14 extending into the T-slot 52. As shown in FIG. 7, the front face 15 of the leg 14 comes near, but does not actually touch one side of the throat 54 of T-slot 52. The other side of the throat 54 abuts lower face 34 at the entry of the throat 54. The toe 18 hooks under and presses against the edge formed at the transition between the T-slot's throat 54 and head space 56. Thus, loads placed on loading surface 12 cause the loading plank 10 to be depressed against the table's top surface and toe 18 to be pressed against the edge formed at the transition between the T-slot's throat 54 and head space 56, holding loading plank 10 firmly in place. Consequently, a load on loading surface 12 will not lever the leg 14 from a ⅝" T-slot 52.

Figure 8:
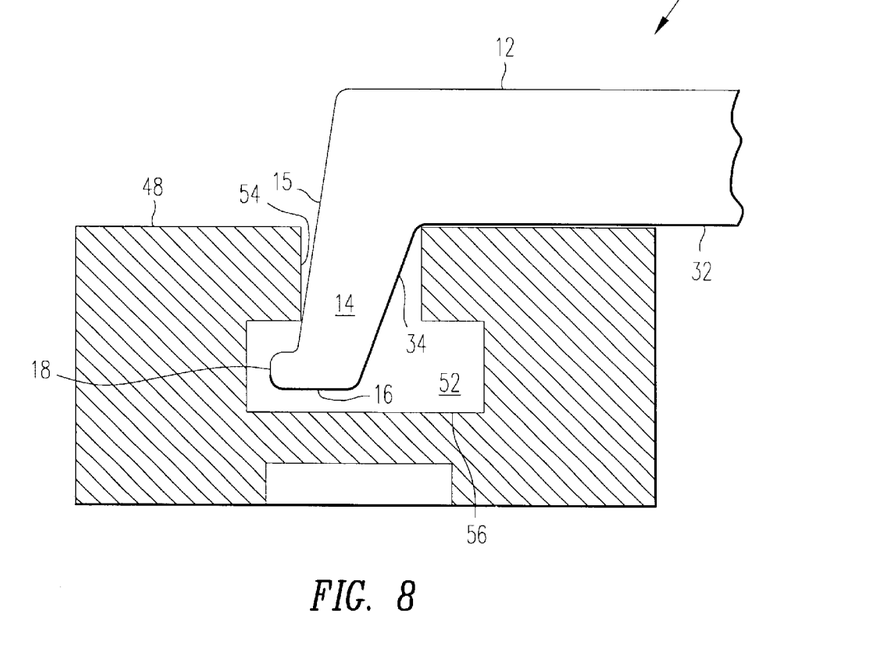
FIG. 8 illustrates a cross-sectional view of the loading plank as affixed to yet another different sized T-slot in a machine tool table.

FIG. 8 illustrates a cross-sectional view of the loading plank 10 affixed to yet another different sized T-slot 52 in a machine tool table 48. The T-slot 52 is the size used in small knee milling machines, such as those made by Bridgeport. A portion of the supporting surface 32 rests on the top surface of the machine tool table 48 with the leg extending into the T-slot 52. The front face 15 rests against one side of the throat 54, while the other side of the throat 54 abuts against the lower face 34 at the entry of the throat 54. As shown in FIG. 8, toe 18 and foot 16 are within head space 56 but do not contact the sides of head space 56. Therefore, the leg 14 is held in place in the throat 54 of T-slot 52 solely by the wedging action of the front face 15 and lower face 34 in the throat 54. Loads placed on the loading surface 12 cause the loading plank 10 to be depressed against the table's upper surface, which further wedges the leg 14 into the T-slot 52, preventing loads on loading surface 12 from levering the leg 14 from the T-slot 52.

Figure 9:
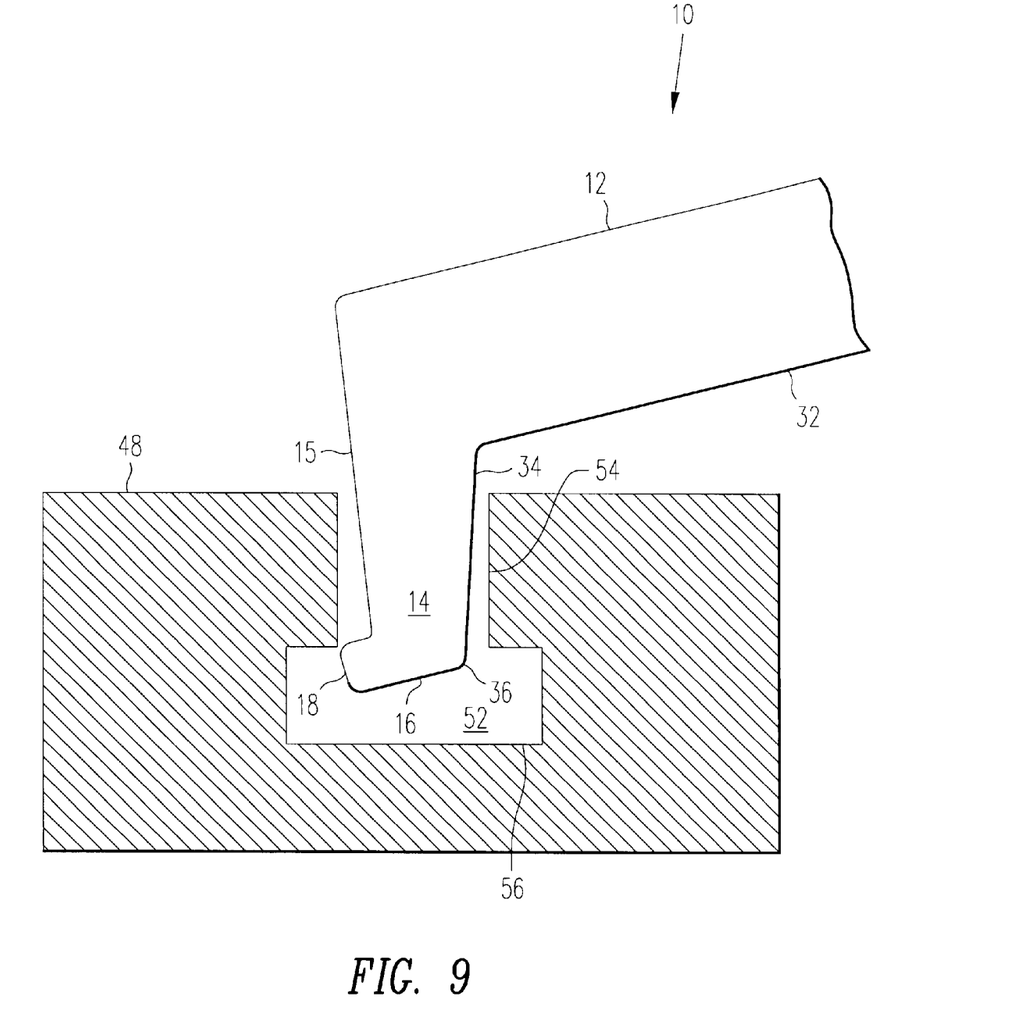
FIG. 9 illustrates the loading plank as it is being mounted on (or removed from) a T-slot in a machine tool table.

FIG. 9 illustrates the loading plank 10 as it is being mounted on (or removed from) a T-slot 52 of a machine tool table 48. As shown in FIG. 9, the loading plank 10 has the end opposite leg 14 raised so that the loading surface 12 is tilted in relationship with the surface of the machine tool table 48. The tilting of loading plank 10 allows the leg 14 and foot 16 to clear both sides of throat 54 of T-slot 52 while leg 14 and foot 16 are inserted into or removed from T-slot 52. Moreover, the converging planes of the front face 15 and lower face 34 reduce the longitudinal cross-section thickness of the leg 14 at the foot 16 to further facilitate insertion into and removal from T-slot 52. During installation, once toe 18 enters head space 56, loading plank 10 may be tilted back so that loading surface 12 is parallel with the upper surface of the machine tool table 48, which hooks toe 18 under the edge formed at the transition between the T-slot's throat 54 and head space 56. During removal, loading surface 12 is already parallel with the upper surface of machine tool table 48 and is tilted so that toe 18 and heel 36 can clear throat 54. Leg 14 and foot 16 (including toe 18 and heel 36) are then lifted out of T-slot 52. In an embodiment in which both the toe 18 and heel 36 have rounded edges, the rounded edges advantageously facilitate the passage of foot 16 into and out of the throat 54 and head space 56 of the T-slot 52.

Figure 10:
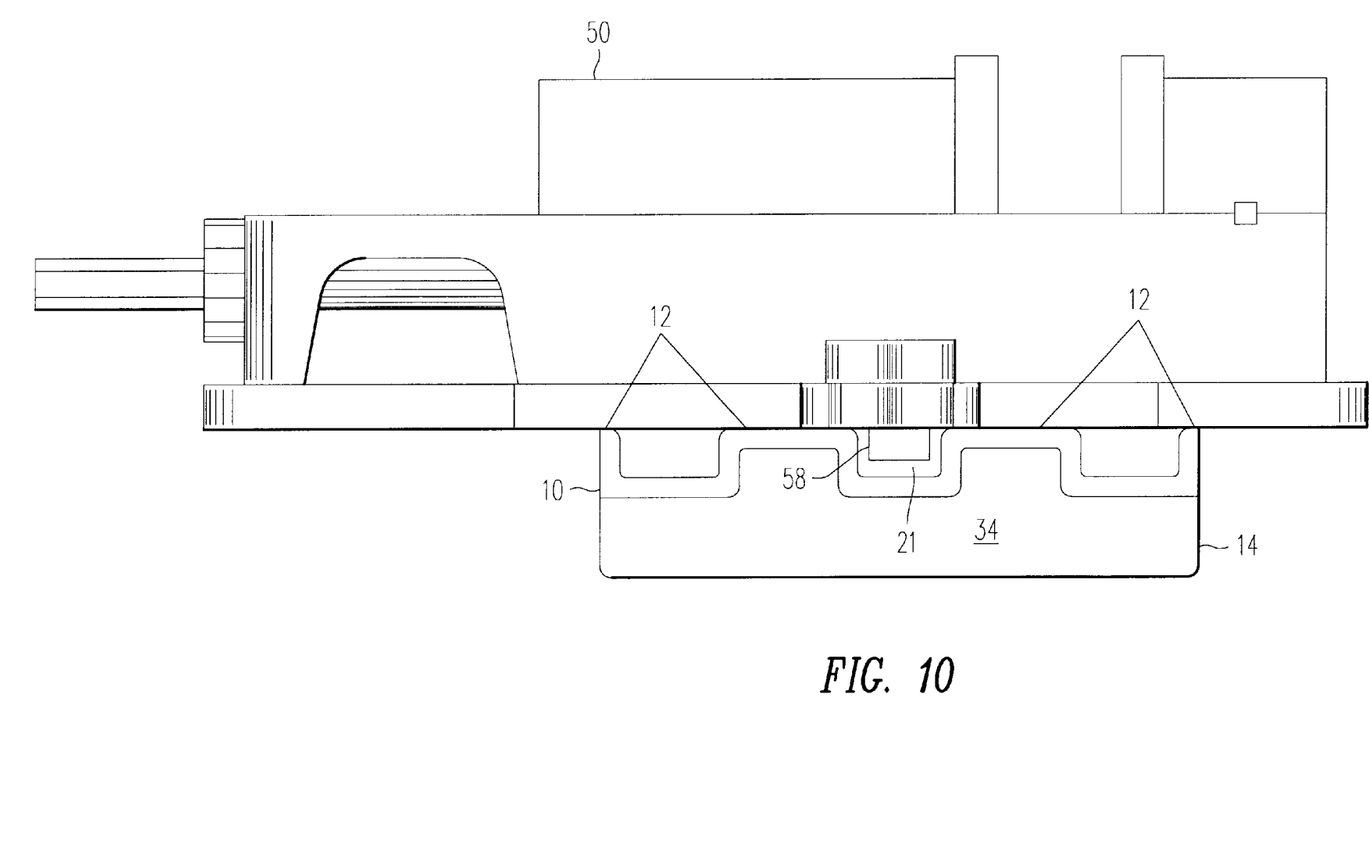
FIG. 10 shows an end view of a machine vise supported by the loading plank.

In one embodiment of the present invention, loading plank 10 includes at least one longitudinal groove 21 in the upper loading surface 12 to provide a guide track for a key or locating pin of tooling or equipment, such as a vise. FIG. 10 shows an end view of loading plank with a machine vise 50 supported on the upper loading surface 12, as viewed from the end opposite leg 14 on loading plank 10. FIG. 10 shows loading plank 10 as it would be used for installing equipment, e.g., vise 50, onto a machine tool table (not shown for the sake of clarity), with vise 50 being positioned perpendicular to the length of loading plank 10. As shown in FIG. 10, the location key 58 provided on vise 50 is slideably engaged with central groove 21, which acts as a guide to prevent vise 50 from accidentally slipping off loading plank 10 as vise 50 slides along loading surface 12 of loading plank 10.

In one embodiment of the present invention, the central guiding groove 21 is configured to accommodate the locating key 58 of a standard six inch size machine vise. A typical six inch size machine vise, for example, is the Model D675, 7.5" jaw capacity, Anglock 6" Vise manufactured by Kurt Manufacturing Co. located in Minneapolis, Minn.

Figure 11:
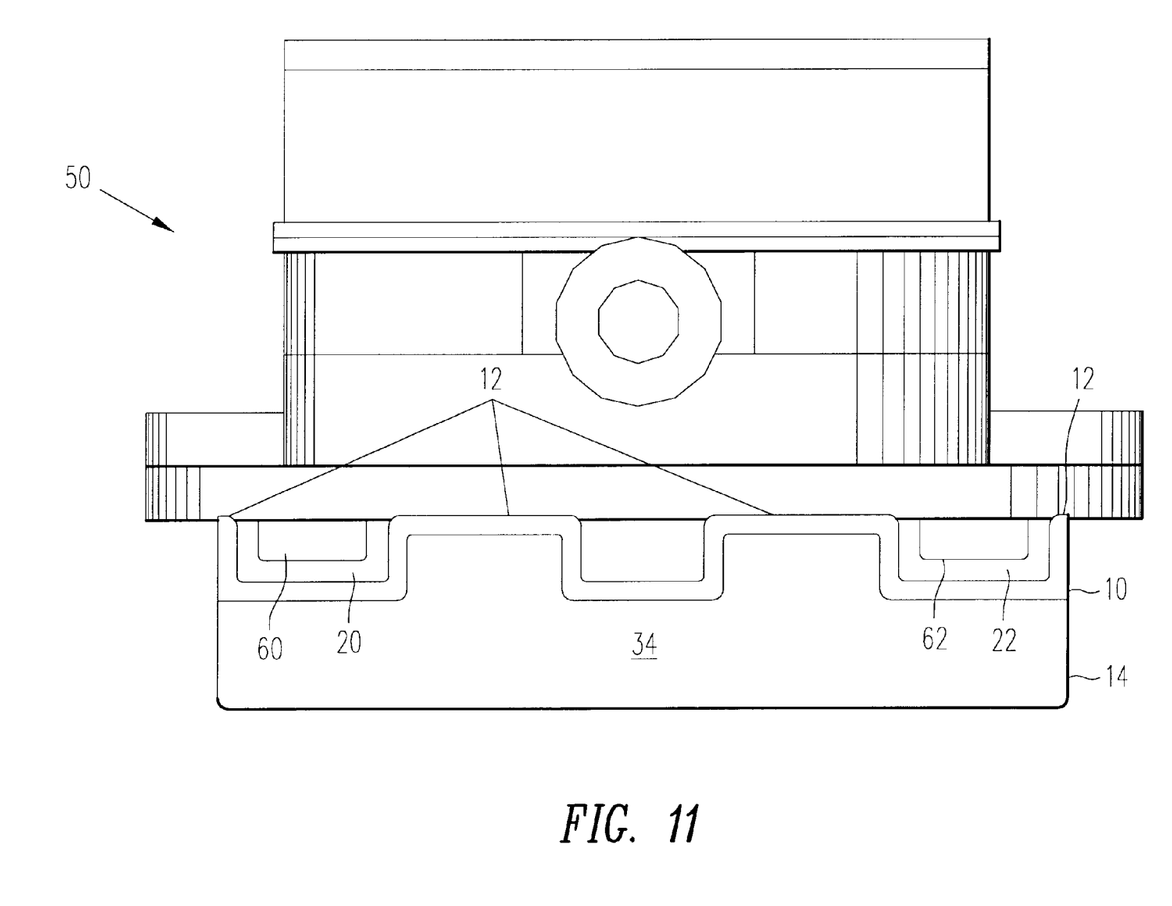
FIG. 11 shows an end view of a machine vise supported by the loading plank.

Loading plank 10 includes two additional grooves 20, 22 on loading surface 12, which may also accommodate the locating keys 58 of a standard six inch size machine vise, or any other desired size vise or equipment. FIG. 11 shows an end view of loading plank 10 with a machine vise 50 supported on the upper loading surface 12, as viewed from the end of loading plank 10 opposite leg 14. FIG. 11 is similar to FIG. 10 except that vise 50 is orientated parallel with loading plank 10 and location keys 60, 62 are slideably engaged with respective grooves 20, 22, which act as guides to prevent vise 50 from accidentally slipping off loading plank 10.

Figure 12:
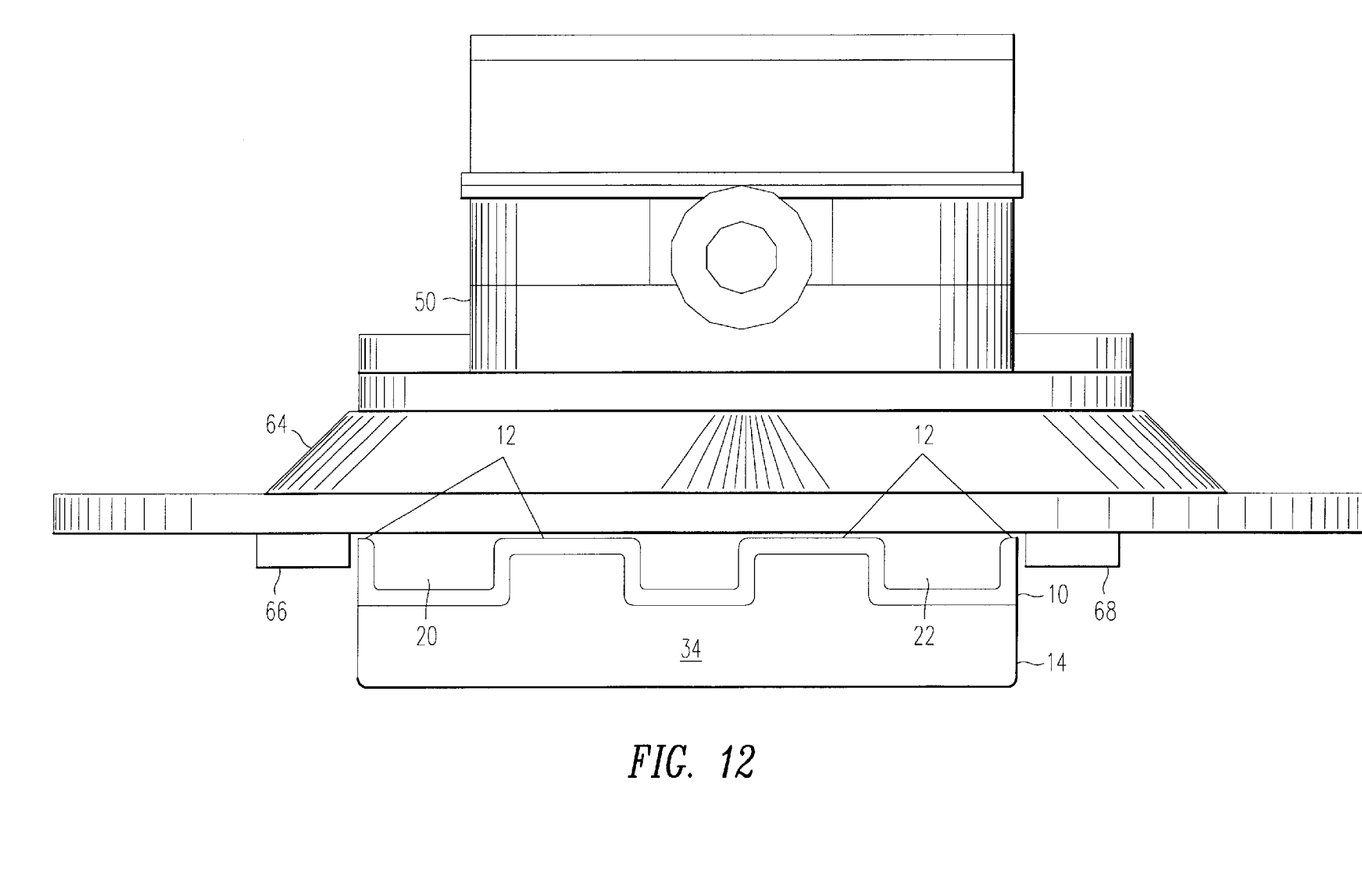
FIG. 12 shows an end view of a machine vise mounted on a graduated adjustable angle vise base supported by the loading plank.

FIG. 12 shows an end view of a loading plank 10 with a machine vise 50 mounted on a graduated adjustable angle vise base 64 supported by the upper loading surface 12, as viewed from the end of loading plank 10 opposite leg 14. The width of loading plank 10 is configured to accommodate locating keys 66, 68 of the conventional graduated adjustable angle vise base 64 for machine vise 50, which may for example be a typical six inch size machine vise. The angle vise base 64 permits the operator to place vise 50 in any desired orientation. The location keys 66, 68 provided on graduated adjustable angle vise base 64 ride along the outside of the side edges of loading plank 10 to prevent base 64 and machine vise 50 from accidentally slipping off loading plank 10.

Although the present invention has been described in considerable detail with reference to certain versions thereof, other versions are possible. For example, the shapes and dimensions of loading plank 10 are exemplary, and other shapes and dimensions may be used if desired. Further, it should be understood that any suitable material and method of manufacture may be used. In addition, it should be understood that multiple loading planks may be used in tandem to assist in loading and unloading of particularly heavy items. Therefore, the spirit and scope of the appended claims should not be limited to the description of the versions depicted in the figures.

What is claimed is:

1. An equipment loading apparatus for loading equipment onto a machine tool table, said apparatus comprising:
   a plank having an upper loading surface, a supporting bottom surface, a first end, and a second end;
   a leg coupled to said first end of said plank, said leg extending downward from said first end wherein said leg has a first thickness at said first end and a second thickness at said foot, said first thickness being greater than said second thickness;
   a foot coupled to said leg, said foot extending from said leg;
   wherein said foot and said leg are inserted into a slot in said machine tool table and a portion of said supporting bottom surface rests on a top surface of said machine tool table to mount said apparatus to said machine tool table.

2. A method of loading equipment onto a machine tool table, said method comprising:
   mounting a loading plank onto a machine tool table, said loading plank having a plank body with a top surface, a bottom surface, a first end, and a second end, said loading plank further comprising a leg downwardly extending from said first end and a foot outwardly extending from said leg, said foot being approximately parallel with said plank body;
   placing said equipment onto said top surface;
   sliding said equipment over said top surface and onto said machine tool table; and
   removing said loading plank from said machine tool table.

3. The method of claim 2, said mounting a loading plank onto a machine tool table comprises:
   tilting said loading plank such that said first end is lower than said second end;
   inserting said foot and said leg into a T-slot in said machine tool table; and
   lowering said second end such that a portion of said bottom surface of said loading plank rests on said machine tool table.

4. The method of claim 2, wherein said placing said equipment onto the top surface further comprises placing a locating key on said equipment into a groove in said top surface of said loading plank.

* * * * *